(12) United States Patent
Balchandran et al.

(10) Patent No.: US 9,058,319 B2
(45) Date of Patent: Jun. 16, 2015

(54) SUB-MODEL GENERATION TO IMPROVE CLASSIFICATION ACCURACY

(75) Inventors: Rajesh Balchandran, Conger, NY (US); Linda M. Boyer, Ossining, NY (US); Gregory Purdy, Hopewell Junction, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 2451 days.

(21) Appl. No.: 11/764,274

(22) Filed: Jun. 18, 2007

(65) Prior Publication Data
US 2008/0312904 A1     Dec. 18, 2008

(51) Int. Cl.
    G06F 17/27     (2006.01)

(52) U.S. Cl.
    CPC .................................. G06F 17/2715 (2013.01)

(58) Field of Classification Search
USPC ............... 704/10, 9, 255, 257, 251, 235, 1; 707/999.101; 703/22; 341/28
See application file for complete search history.

(56) References Cited

U.S. PATENT DOCUMENTS

| | | | | |
|---|---|---|---|---|
| 5,477,451 | A  * | 12/1995 | Brown et al. | 704/9 |
| 5,625,748 | A  * | 4/1997  | McDonough et al. | 704/251 |
| 5,675,706 | A    | 10/1997 | Lee et al. | |
| 6,311,152 | B1   | 10/2001 | Bai et al. | |
| 6,609,087 | B1 * | 8/2003  | Miller et al. | 703/22 |
| 6,615,172 | B1   | 9/2003  | Bennett et al. | |
| 6,636,162 | B1 * | 10/2003 | Kushler et al. | 341/28 |
| 6,732,090 | B2 * | 5/2004  | Shanahan et al. | 1/1 |
| 6,816,858 | B1   | 11/2004 | Coden et al. | |
| 6,931,351 | B2   | 8/2005  | Verma et al. | |
| 7,275,033 | B1 * | 9/2007  | Zhao et al. | 704/255 |
| 7,509,578 | B2   | 3/2009  | Rujan et al. | |
| 7,606,700 | B2   | 10/2009 | Ramsey et al. | |
| 8,285,539 | B2   | 10/2012 | Balchandran et al. | |
| 2002/0002450 | A1 | 1/2002 | Nunberg | |
| 2002/0099730 | A1 | 7/2002 | Brown et al. | |
| 2002/0123891 | A1 * | 9/2002 | Epstein | 704/235 |
| 2002/0196679 | A1 | 12/2002 | Lavi et al. | |
| 2003/0130841 | A1 | 7/2003 | Bangalore et al. | |
| 2003/0191625 | A1 | 10/2003 | Gorin et al. | |
| 2004/0148170 | A1 | 7/2004 | Acero | |
| 2004/0243408 | A1 | 12/2004 | Gao et al. | |
| 2005/0075878 | A1 * | 4/2005 | Balchandran et al. | 704/257 |
| 2006/0116862 | A1 * | 6/2006 | Carrier et al. | 704/1 |
| 2007/0106496 | A1 | 5/2007 | Ramsey | |

(Continued)

OTHER PUBLICATIONS

Gupta, N. et al., "The AT&T Spoken Language Understanding System," IEEE Trans. on Audio, Speech & Language Processing, vol. 14, No. 1, Jan. 2006, 10 pgs.

*Primary Examiner* — Michael Colucci
(74) *Attorney, Agent, or Firm* — Cuenot, Forsythe & Kim, LLC

(57) ABSTRACT

A method of classifying text input for use with a natural language understanding system can include determining classification information including a primary classification and one or more secondary classifications for a received text input using a statistical classification model (statistical model). A statistical classification sub-model (statistical sub-model) can be selectively built according to a model generation criterion applied to the classification information. The method further can include selecting the primary classification or the secondary classification for the text input as a final classification according to the statistical sub-model and outputting the final classification for the text input.

20 Claims, 4 Drawing Sheets

(56) References Cited

U.S. PATENT DOCUMENTS

| | | | |
|---|---|---|---|
| 2007/0124134 A1* | 5/2007 | Van Kommer | 704/10 |
| 2008/0208567 A1* | 8/2008 | Brockett et al. | 704/9 |
| 2008/0310718 A1 | 12/2008 | Balchandran et al. | |
| 2008/0312905 A1 | 12/2008 | Balchandran et al. | |
| 2008/0312906 A1 | 12/2008 | Balchandran et al. | |
| 2010/0100380 A1 | 4/2010 | Tur | |

* cited by examiner

SUB-MODEL GENERATION TO IMPROVE CLASSIFICATION ACCURACY

BACKGROUND OF THE INVENTION

Natural language understanding (NLU) refers to the technology that allows computers to understand, or derive meaning from, written human languages. In general, NLU systems determine meaning from text. The meaning, and potentially other information extracted from the text, can be provided to other systems. For example, an NLU system used for an airline can be trained to recognize user intentions such as making a reservation, cancelling a reservation, checking the status of a flight, etc. from received text. The text provided to the NLU system as input can be obtained from a speech recognition system, keyboard entry, or some other mechanism. The NLU system determines the meaning of the text and typically provides the meaning, or user intention, to one or more other applications. The meaning can drive business logic, effectively trigging some programmatic function corresponding to the meaning. For example, responsive to a particular meaning, the business logic can initiate a function such as creating a reservation, canceling a reservation, etc.

A classifier functions as part of an NLU system. At runtime, the classifier receives a text input and determines one of a plurality of classes to which the text input belongs. The classifier utilizes a statistical classification model (statistical model) to classify the text input. Each class corresponds to, or indicates, a particular meaning. For example, a text input such as "I would like to book a flight" can be classified into a class for "making a reservation." This class, and possibly other information extracted from the text input, can be passed along to another application for performing that action.

The statistical model used by the classifier is generated from a corpus of training data. The corpus of training data can be formed of text, feature vectors, sets of numbers, or the like. Typically, the training data is tagged or annotated to indicate meaning. The statistical model is built from the annotated training data. In general, classifiers can achieve acceptable levels of classification accuracy under favorable data conditions.

Examples of unfavorable data conditions can include a lack of sufficient training data, overlap in the training data between two or more classes, poor correlation between the training data and actual input data, and classification errors within the training data. Other examples of unfavorable data conditions can include a lack of strong features in the training data that clearly and unambiguously predict the expected class or the same word or phrase appearing in training sentences that map to several different classes. These data conditions can result in confusion between two or more classes and poor overall accuracy in classification.

BRIEF SUMMARY OF THE INVENTION

The present invention relates to classification of text for use with a natural language understanding (NLU) system. One embodiment of the present invention can include a method of classifying a text input for use with an NLU system. The method can include determining classification information including a primary classification and one or more secondary classifications for a received text input using a statistical classification model (statistical model). A statistical classification sub-model (statistical sub-model) can be selectively built according to whether the classification information, for example, specifying an initial classification or potential initial classifications, conforms to an accuracy requirement or some other condition. The method further can include selecting the primary classification or the secondary classification for the text input as a final classification according to the statistical sub-model, and outputting the final classification for the text input.

Another embodiment of the present invention can include a method of improving classification accuracy of text input for use with an NLU system. The method can include processing a plurality of text inputs using a statistical model and a statistical sub-model, wherein the statistical model includes a plurality of classes and the statistical sub-model includes a subset of the plurality of classes. A usage frequency of the statistical sub-model can be determined. The method further can include comparing the usage frequency with a minimum frequency threshold level, and merging the subset of the plurality of classes into a single, merged class within the statistical model when the usage frequency exceeds the minimum frequency threshold level. The method also can include outputting an updated statistical model specifying the merged class.

Yet another embodiment of the present invention can include a computer program product including a computer-usable medium having computer-usable code that, when executed, causes a machine to perform the various steps and/or functions described herein.

DETAILED DESCRIPTION OF THE INVENTION

Figure 1:
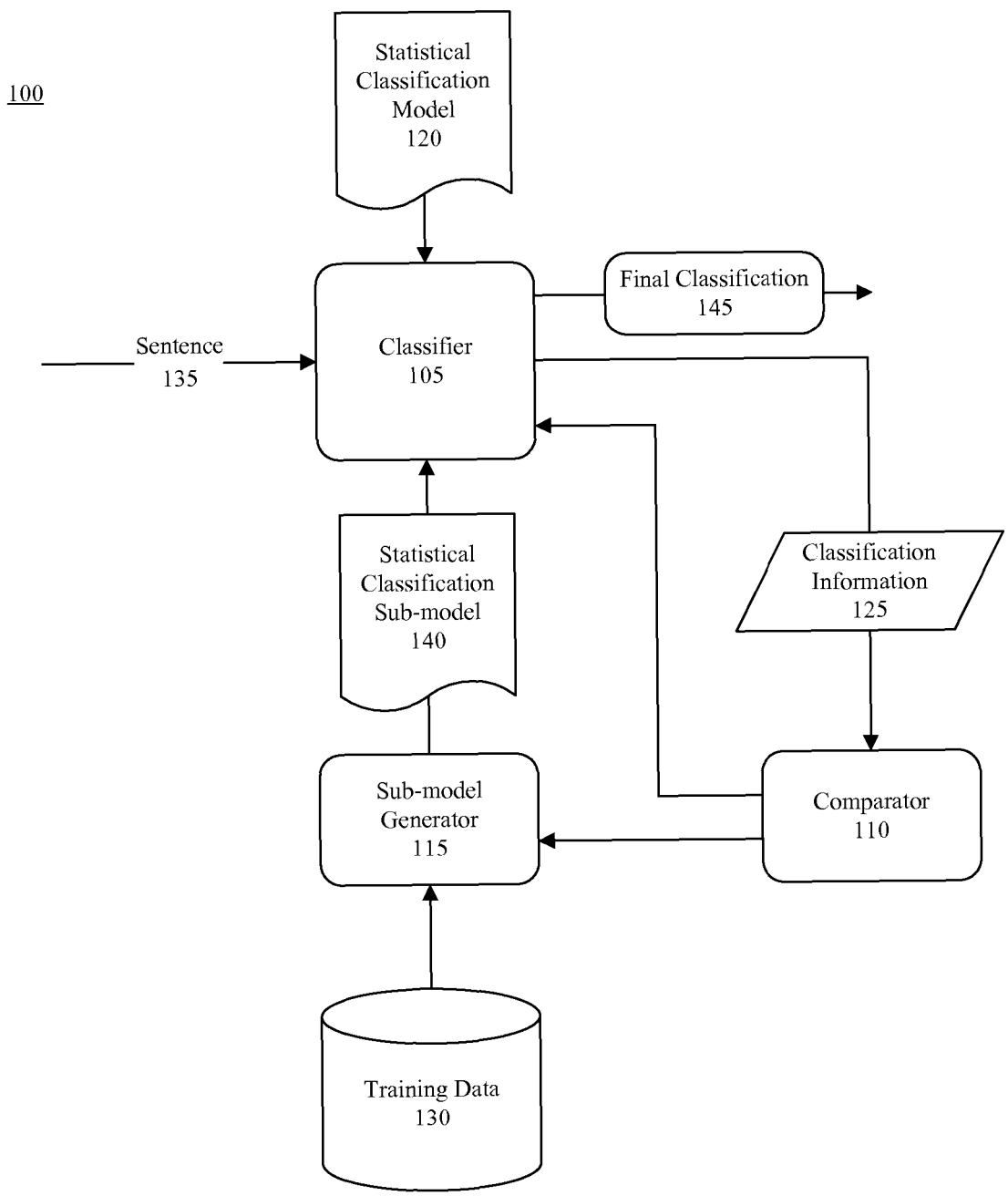
FIG. 1 is a block diagram illustrating a system for classifying text in accordance with one embodiment of the present invention.

As will be appreciated by one skilled in the art, the present invention may be embodied as a method, system, or computer program product. Accordingly, the present invention may take the form of an entirely hardware embodiment, an entirely software embodiment, including firmware, resident software, micro-code, etc., or an embodiment combining software and hardware aspects that may all generally be referred to herein as a "circuit," "module," or "system."

Furthermore, the invention may take the form of a computer program product accessible from a computer-usable or computer-readable medium providing program code for use by, or in connection with, a computer or any instruction execution system. For the purposes of this description, a computer-usable or computer-readable medium can be any apparatus that can contain, store, communicate, propagate, or transport the program for use by, or in connection with, the instruction execution system, apparatus, or device.

Any suitable computer-usable or computer-readable medium may be utilized. For example, the medium can include, but is not limited to, an electronic, magnetic, optical, electromagnetic, infrared, or semiconductor system (or apparatus or device), or a propagation medium. A non-exhaustive list of exemplary computer-readable media can include an electrical connection having one or more wires, an optical fiber, magnetic storage devices such as magnetic tape, a removable computer diskette, a portable computer diskette, a hard disk, a rigid magnetic disk, an optical storage medium, such as an optical disk including a compact disk-read only memory (CD-ROM), a compact disk-read/write (CD-R/W), or a DVD, or a semiconductor or solid state memory including, but not limited to, a random access memory (RAM), a read-only memory (ROM), or an erasable programmable read-only memory (EPROM or Flash memory).

A computer-usable or computer-readable medium further can include a transmission media such as those supporting the Internet or an intranet. Further, the computer-usable medium may include a propagated data signal with the computer-usable program code embodied therewith, either in baseband or as part of a carrier wave. The computer-usable program code may be transmitted using any appropriate medium, including but not limited to the Internet, wireline, optical fiber, cable, RF, etc.

In another aspect, the computer-usable or computer-readable medium can be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the currently available types of network adapters.

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The embodiments disclosed herein relate to the classification of text within a natural language understanding (NLU) system. At runtime of an NLU system, a text input, e.g., a sentence, can be processed by a classifier using a statistical classification model (statistical model). The statistical model can include, or specify, a plurality of possible classifications. The term "sentence," as used herein, can refer to a portion of text such as a grammatically correct sentence, a grammatically incorrect sentence, a fragment or part of a sentence, or any other portion or unit of text that may be received for processing.

The classifier can generate classification information specifying a list of candidate classifications. The list of candidate classifications is a subset of the plurality of classes of the statistical model. The classification information can be evaluated for reliability and/or accuracy. Based upon the evaluation, a statistical classification sub-model (statistical sub-model) can be dynamically generated and used to further process the text input to determine a final classification for the text input.

The statistical sub-model can include only a subset of the plurality of classes of the statistical model and, therefore, likely output a final classification for the text input with a higher accuracy than would be attainable using the initial statistical model alone. The final classification can be output to other systems. As used herein, "outputting" or "output" can include, but is not limited to, writing to a file, writing to a user display or other output device, playing audible notifications, sending or transmitting to another system, exporting, or the like.

FIG. 1 is a block diagram for a system 100 for classifying text in accordance with one embodiment of the present invention. The system 100, for example, can be included within a runtime NLU system to classify text. As shown, the system 100 can include a classifier 105, a comparator 110, a statistical classification sub-model generator (sub-model generator) 115, as well as training data 130. The classifier 105 can operate upon, e.g., classify, text input such as sentence 135. In classifying the sentence 135, the classifier 105 can utilize a statistical model 120 and/or a statistical sub-model 140.

In illustration, the sentence 135 can be processed by the classifier 105 using the statistical model 120. The classifier 105 can output classification information 125. The statistical model 120 can specify, or include, a particular number of classes, e.g., "N" classes. The classification information 125 that is output from the classifier 105 can specify a list of the top candidate classifications from the N classes into which the classifier 105 determines the sentence 135 should be classified. Each of the candidate classifications can be assigned a confidence score that is included in the classification information 125. In general, the confidence score for each candidate classification, or potential class of the sentence 135, can indicate the likelihood that the class associated with that confidence score is the correct classification for sentence 135.

The comparator 110 can receive the classification information 125 as input and evaluate the reliability or accuracy of the classification information 125. Based upon the evaluation, the comparator 110 can determine whether a statistical sub-model should be dynamically generated by the sub-model generator 115 and/or applied to the sentence 135.

When the comparator 110 determines that the classification information 125 is of sufficient quality or accuracy, the comparator 110 can notify the classifier 105. In that case, the candidate classification having the highest confidence score, as determined using the statistical model, can be output as the final classification 145 for the sentence 135. When the comparator 110 determines that the classification information 125 is not of sufficient quality, the comparator can signal the sub-model generator 115 to dynamically generate a statistical sub-model 140. The comparator 110 also can pass the classification information 125, or any portion thereof, to the sub-model generator 115 for use in building the statistical sub-model 140.

The sub-model generator 115 can access the training data 130 to dynamically create the statistical sub-model 140. In one embodiment, the training data 130 can include the training data used to create the statistical model 120. It further should be appreciated that any intermediate data generated when building the statistical model 120 also can be retained or stored as part of the training data 130. In another embodiment, intermediate data can be retained or stored in lieu of the training data 130. In either case, the training data, the intermediate data, or both can be available for statistical model/sub-model creation at runtime of the system 100.

In one embodiment, the intermediate data can refer to features. Features can include, but are not limited to, n-grams that specify a frequency with which each respective n-gram occurs in each class or weighted n-grams. N-grams can be weighted using a variety of techniques. For example, n-grams can be assigned lower or higher weights according to importance or non-importance with respect to meaning or class. Words such as "the," for instance, would be considered less important. N-grams also can be weighted according to a speech recognition score. The statistical sub-model 140 can be created using this intermediate data, e.g., features, or a subset thereof, used to generate the statistical model 120.

The sub-model generator 115 can select a subset of the training data 130 that corresponds to the classification information 125, or some portion of the classification information 130. The subset of the training data 130 can be used to generate the statistical sub-model 140. It should be appreciated that the statistical sub-model 140, as with the statistical model 120, can be constructed using any of a variety of statistical model generation techniques, e.g., maximum entropy classification, maximum likelihood classification, or the like. Once created, the classifier 105 can process, or re-process as the case may be, the sentence 135 using the statistical sub-model 140. The result from processing the sentence 135 using the statistical sub-model 140 can be output as the final classification 145.

Figure 2:
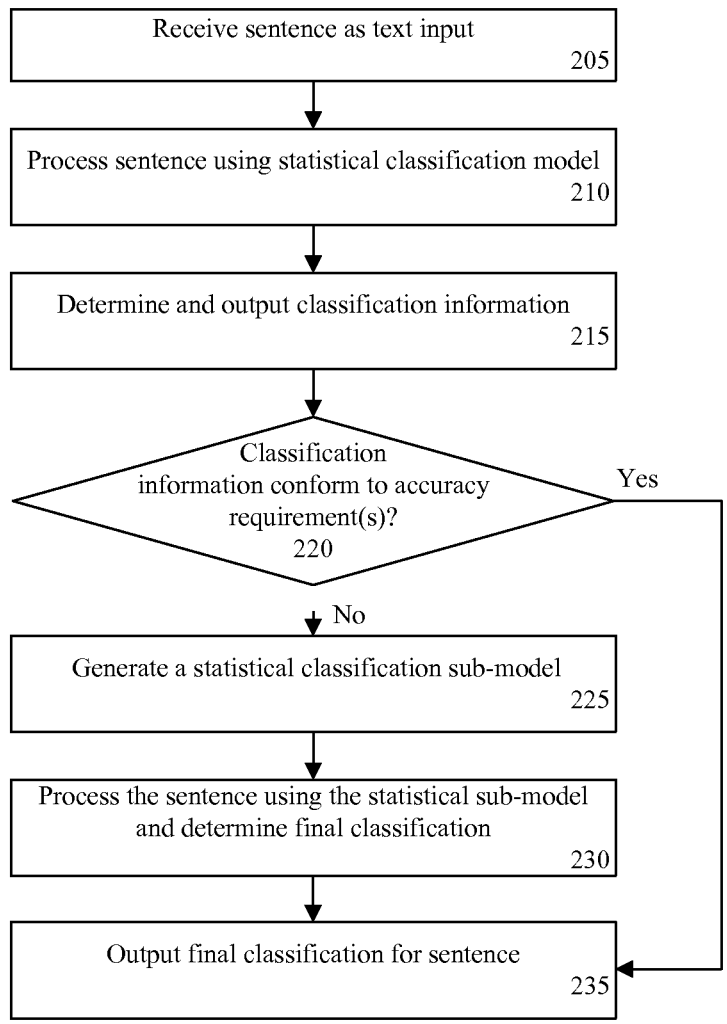
FIG. 2 is a flow chart illustrating a method of classifying text in accordance with another embodiment of the present invention.

FIG. 2 is a flow chart illustrating a method 200 of classifying text in accordance with another embodiment of the present invention. The method 200 can be implemented using the system described with reference to FIG. 1 or another system having similar functionality. For example, a classification system as described with reference to FIG. 1 can be included within an NLU system. The NLU system can be operational such that the method 200 can be viewed as a "runtime" description of a classification system within the NLU system.

Accordingly, the method 200 can begin in step 205 where a text input, e.g., a sentence, is received by the NLU system and classification system. In step 210, the sentence can be processed using a statistical model. As noted, the classifier can include a statistical model that can specify N possible classes into which received sentences or text inputs can be assigned.

In step 215, the classifier can determine and output classification information. The classification information can specify a list of candidate classifications, with each candidate classification having a corresponding confidence score. As noted, a confidence score can indicate the likelihood that the class into which the sentence is classified, in this case a given candidate classification, is correct. The list can be ordered or sorted according to decreasing confidence score. In this manner, the classification information can be said to specify a primary classification, e.g., the candidate classification having the highest confidence score, and one or more secondary classifications in reference to the remaining candidate classifications. In illustration, the statistical model may include 100 possible classes, e.g., N=100. The classification system can be configured to output a list of the top candidate classifications, whether 2, 3, 4, 5, 10, or some other number. Thus, the list of candidate classifications is a subset of the number of possible classes enumerated by the statistical model.

In step 220, a determination can be made as to whether the classification information conforms to one or more accuracy requirements. If the classification information is determined to be accurate, e.g., conforming to the accuracy requirement(s), the method can proceed to step 235, where the primary classification is output as the final classification for the received sentence. If not, the method can continue to step 225 where processing using a statistical sub-model can be performed.

In one embodiment, the determination as to whether the classification information conforms to an accuracy requirement can include evaluating the primary classification. The confidence score of the primary classification, i.e., the candidate classification having the highest confidence score, can be compared against a minimum threshold level. If the confidence score of the primary classification exceeds the minimum threshold level, the classification information conforms to the accuracy requirement. Otherwise, statistical sub-model processing can be invoked.

In another embodiment, the difference between confidence scores of one or more pairs of candidate classifications can be calculated. If the difference in confidence score of one or more pairs of candidate classifications does not exceed a difference threshold level, the classification information can be said to not conform to the accuracy requirement(s). For example, if the classification information specifies candidate classes A, B, and C, with confidence scores of 35, 34, and 31 respectively, a difference between the confidence scores of A and B, A and C, or B and C can be computed. If a difference for one or more of the pairs is less than the difference threshold level, the classification information does not conform to the accuracy requirement(s) and sub-model processing can be invoked.

In another embodiment, the difference between confidence scores can refer to a relative difference. For example, the relative difference of confidence scores can be computed as (A−B)/A or (B−C)/A, or the like. It should be appreciated that when multiple differences are calculated an average of the differences or some other function of the differences can be compared to the different threshold level rather than the difference in confidence scores of a single pair of candidate classifications.

In another embodiment, the candidate classifications can be identified and if one or more predetermined classes are specified within the candidate classifications, statistical sub-model processing can be invoked. In that case, the classification information does not conform to the accuracy requirement(s). For example, the classification information can specify candidate classifications A, B, C, and D. Through empirical study of the operation of the system, the classification system can be configured to flag occasions where the candidate classifications include the pair B and D. Since there has been a determination that classes B and D are difficult to distinguish from one another, statistical sub-model processing can be invoked.

It further should be appreciated that the various techniques disclosed herein for determining whether the classification information conforms to accuracy requirement(s) can be used individually or in any combination, e.g., as part of a larger function which provides an indication of accuracy for the classification information.

In step 225, a statistical sub-model can be generated. The statistical sub-model can be generated using a subset of classes from the plurality of classes in the statistical model. It should be appreciated that while the statistical sub-model is largely described as being generated from selected sentences of the training data, the statistical sub-model also can be generated from selected features originally used to create the initial statistical model. Features, e.g., n-grams, from the training data corresponding to the classes selected for use in the statistical sub-model can be used in lieu of sentences.

In one embodiment, each of the candidate classifications determined by the classification system using the statistical model can be used to create the statistical sub-model. For example, if the candidate classifications are A, B, C, and D, the sentences from the training data associated with classes A, B, C, and D can be selected and used to create the statistical sub-model. The statistical sub-model will be better able to distinguish between classes A, B, C, and D. That is, the classification of the sentence into one of classes A, B, C, or D will have a higher confidence score than a result obtained using the statistical model, e.g., the initial statistical model having N possible classes, alone.

In another embodiment, a subset of the candidate classifications can be used to generate the statistical sub-model. For example, if the candidate classifications are A, B, C, D, and E, the subset A and B can be selected. In that case, the statistical sub-model can be generated by selecting sentences in the training data associated with classes A and B and generating the statistical sub-model from those sentences only. The resulting statistical sub-model will be better able to classify the sentence into class A or B. That is, the classification of the sentence into one of classes A or B will have a higher confidence score than a result obtained using the statistical model, e.g., the initial statistical model having N classes, alone.

The subset of the candidate classifications used for generating the statistical sub-model can be selected in any of a variety of ways. For example, a predetermined number of the candidate classifications can be selected, i.e., the two, three, or four candidate classifications with the highest confidence score. In another example, each candidate classification having a confidence score above a threshold can be selected. In still another example, the candidate classifications having the highest confidence scores that are within some predetermined range of one another can be selected, e.g., as determined using a difference between confidence scores.

In step 230, the sentence can be processed using the statistical sub-model. A final classification can be determined for the sentence according to the statistical sub-model. In step 235, the classification result determined using the statistical sub-model can be output as the final classification for the received sentence.

In one embodiment, statistical sub-models can be stored or cached for future use if desired. Storing the statistical sub-model relieves the system from having to dynamically create the same statistical sub-models more than one time. For example, if a statistical sub-model is created for candidate classifications A, B, and C, the next time that a statistical sub-model is needed for classifications A, B, and C, the stored statistical sub-model can be recalled. Further, the statistical sub-model for candidate classifications A, B, and C, where A has the highest confidence score and C has the lowest confidence score, also can be used or applied in cases where the candidate classifications are ordered as C, B, and A, with C having the highest confidence score and A the lowest. The ordering of the candidate classifications used to create the statistical sub-model, in terms of confidence score, is not relevant.

Figure 3:
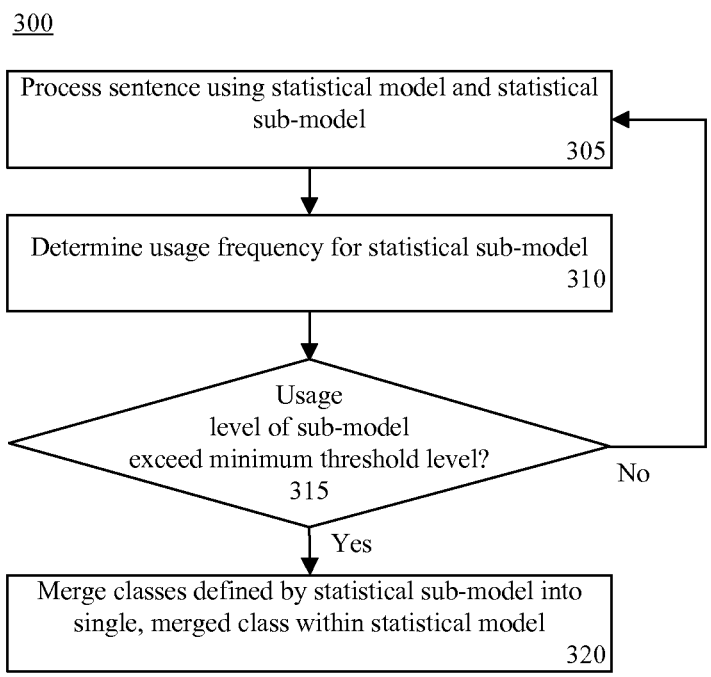
FIG. 3 is a flow chart illustrating a method of reducing the number classes in a classifier in accordance with another embodiment of the present invention.

FIG. 3 is a flow chart illustrating a method 300 of reducing the number of classes in a classification system in accordance with another embodiment of the present invention. The method 300 can be implemented within a system as described with reference to FIG. 1 or another system having similar functionality. The method 300 can begin in a state in which a classification system, or classifier, is executing within an NLU system and processing text inputs. The method 300 can be implemented from time to time, periodically, or after each application of a statistical sub-model. It should be appreciated that although the method 300 is described with reference to a single statistical sub-model, the method 300 can be applied to a plurality of statistical sub-models or all statistical sub-models of a given classification system.

Accordingly, in step 305, a plurality of sentences can be processed using a statistical model and a statistical sub-model. In step 310, the usage frequency of the statistical sub-model can be determined. The frequency of use of the statistical sub-model by the classifier to process sentences can be monitored or tracked. For example, once the statistical sub-model is generated, a counter can be instantiated that is incremented each time the statistical sub-model is used. Time stamp information as to when the statistical sub-model is used also can be stored and tracked.

In step 315, the usage frequency of the statistical sub-model can be compared to a minimum frequency threshold level. If the usage frequency is above the minimum frequency threshold level, the method can proceed to step 320. If not, the method can loop back to continue processing sentences and monitoring the usage frequency of the statistical sub-model. In one embodiment, the usage frequency can be specified in terms of the total number of times the statistical sub-model is used. In another embodiment, the usage frequency can be specified in terms of the number of times the statistical sub-model is used within a defined time period, e.g., over several hours, a day, a week, a month, or the like.

In step 320, when the usage frequency of the statistical sub-model exceeds the minimum frequency threshold level, the subset of classes dealt with by the statistical sub-model can be merged or otherwise treated as a single, merged class within the statistical model. In illustration, a high usage frequency for a statistical sub-model that is built for classes A, C, D, and F can be an indication that the statistical model is unable to reliably distinguish between these classes when classifying a text input at runtime. Thus, for purposes of the statistical model, classes A, C, D, and F can be merged or treated as a single class. The number of classes that the statistical model must deal with is reduced from N to a number that is N−(M−1), where "M" represents the number of classes being merged, e.g., the number of classes upon which the statistical sub-model is built.

In one embodiment, the classes can be merged by mapping each of classes A, C, D, and F within the statistical model to a single merged class, e.g., class $A_{merged}$. In another embodiment, the statistical model can be retrained or rebuilt. For example, training data having sentences originally associated with classes A, C, D, and F can be updated by associating such sentences with class $A_{merged}$. An updated statistical model can be constructed from the updated training data. In either case, the statistical model will not attempt to distinguish between classes A, C, D, or F. Rather, the statistical sub-model will be stored or cached and recalled in those cases where the statistical model classifies a received sentence into the merged class, e.g., class $A_{merged}$.

Figure 4:
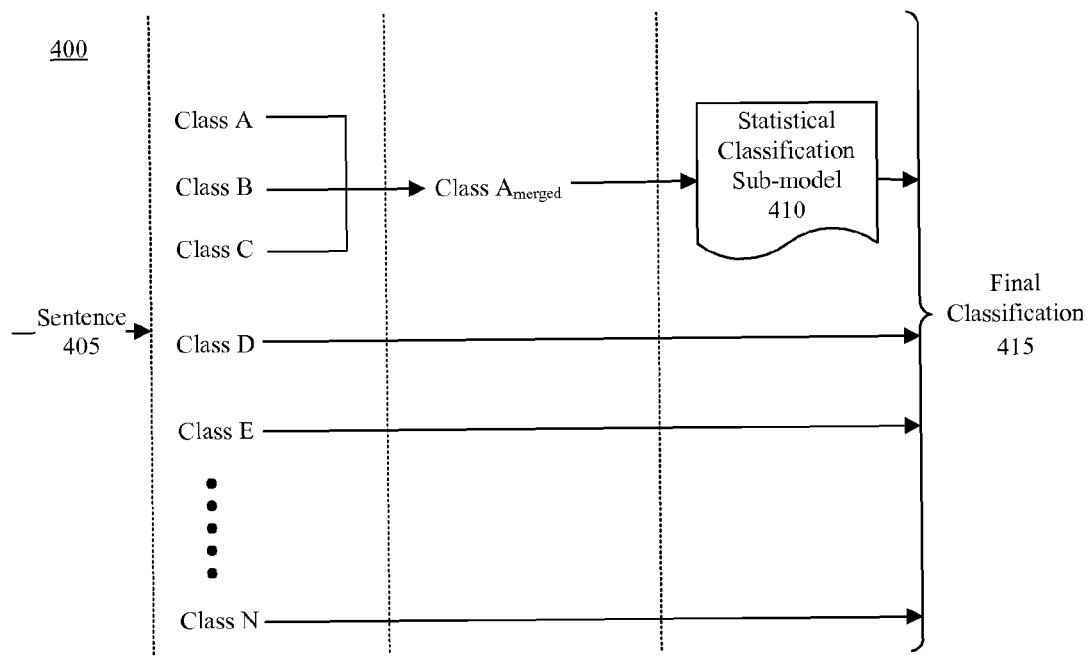
FIG. 4 is a block diagram illustrating various operational aspects of a classification system in accordance with another embodiment of the present invention.

FIG. 4 is a block diagram illustrating various operational aspects of a classification system 400 in accordance with another embodiment of the present invention. In this example, it is assumed that a statistical sub-model for classes A, B, and C has been determined to have a high usage frequency. Accordingly, classes A, B, and C have been mapped to a single, merged class $A_{merged}$. The example of FIG. 4 assumes the classification system 400 includes a single statistical sub-model. It should be appreciated that if additional sub-models are included, other classes can be mapped to other merged classes and processed using the particular statistical sub-model associated with the relevant merged class.

In illustration, if sentence 405 is initially classified into class A, B, or C using the statistical model, the classification system 400 can determine that sentence 405 belongs in class $A_{merged}$. Because the initial classification result is a merged class, the classification system 400 can determine that statistical sub-model processing is needed. Accordingly, sentence 405 can be processed using a statistical sub-model 410 for classes A, B, and C. As noted, the statistical sub-model 410 can be dynamically created at runtime or recalled from memory if already in existence. The classification system 400 can output the final classification 415, which indicates either class A, class B, or class C for sentence 405.

If sentence 405 is initially classified as belonging to class D, E, or some other class N, e.g., class D, E, or N is the primary classification, and other accuracy requirement(s) are met, the classification system 400 can determine that statistical sub-model processing is not needed. In that case, the initial classification determined using the statistical model can be output as the final classification 415. No statistical sub-models need be dynamically created or applied to the sentence 405.

Figure 5:
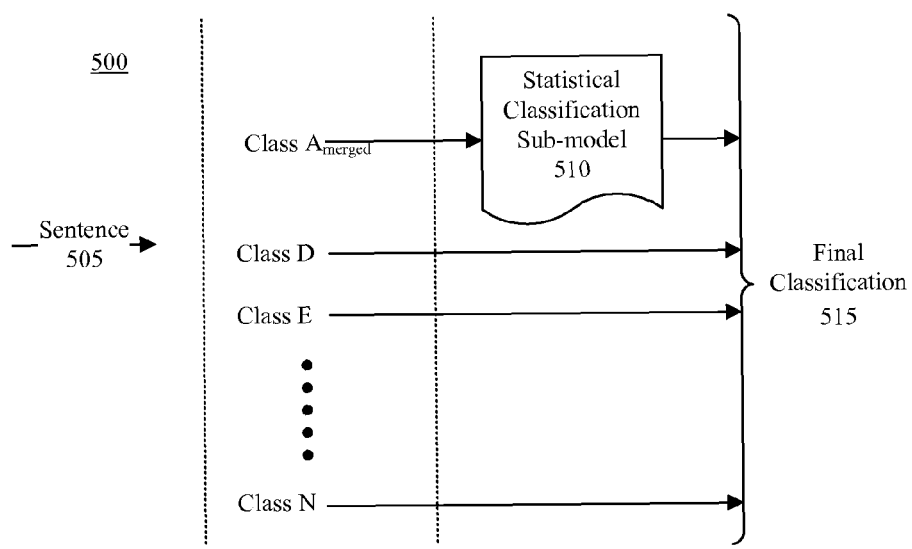
FIG. 5 is a block diagram illustrating various operational aspects of a classification system in accordance with another embodiment of the present invention.

FIG. 5 is a block diagram illustrating various operational aspects of a classification system 500 in accordance with another embodiment of the present invention. In this example, it is assumed that a statistical sub-model for classes A, B, and C has been determined to have a high usage frequency. Accordingly, classes A, B, and C have been merged into class $A_{merged}$. The statistical model has been retrained or recreated. For example, the training data can be updated by associating each sentence originally associated with classes A, B, and C with class $A_{merged}$. The statistical model can be rebuilt, e.g., producing an updated statistical model, using the updated training data.

Accordingly, if sentence 505 is initially classified as belonging to class $A_{merged}$, the classification system 500 can determine that statistical sub-model processing is required. Accordingly, a statistical sub-model 510 for classes A, B, and C can be dynamically created or recalled from memory if already in existence. Sentence 505 can be processed by the classification system 500 using the statistical sub-model 510. One of the classes A, B, or C can be selected during the statistical sub-model processing as the final classification 515.

If sentence 505 is initially classified as belonging to class D, E, or some other class N, e.g., class D, E, or N is the primary classification, and the accuracy requirement(s) are met, the classification system 500 can determine that statistical sub-model processing is not needed. Accordingly, the initial classification determined using the statistical model can be output as the final classification 515. No statistical sub-models need be dynamically created or applied to the sentence 505.

It should be appreciated that the embodiments described herein are not intended to be restricted to a single level of sub-model creation based upon the classifications from the (initial) statistical model. The same techniques can be applied to successive statistical sub-models. For example, following the generation of a statistical sub-model for classifications A, B, C, D, and E, a new set of sub-models can be generated comprising subsets of classifications A, B, C, D, and E. In one embodiment, a determination can be made as to whether an accuracy requirement is met using the statistical sub-model. If not, further sub-models can be created. In this case, for example, the subsets of classifications can include (B, C) or (A, C, and D), or the like. Generation of successive statistical sub-models, where each statistical sub-model uses fewer classifications than the parent statistical model or sub-model, can be carried on as long as may be required and/or desired.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to the embodiments thereof, it will be apparent that modifications and variations are possible without departing from the scope of the invention defined in the appended claims.

What is claimed is:

1. A method of classifying text input for use with a natural language understanding system, the method comprising:
via a processor, determining classification information comprising a primary classification and at least one secondary classification for a received text input using a statistical classification model (statistical model);
via the processor, selectively building a statistical classification sub-model (statistical sub-model) according to whether the classification information conforms to an accuracy requirement;
via the processor, selecting the primary classification or the at least one secondary classification for the text input as a final classification according to the statistical sub-model; and
via the processor, outputting the final classification for the text input.

2. The method of claim 1, wherein selectively building a statistical sub-model further comprises:
via the processor, comparing a confidence score of the primary classification with a minimum threshold level; and
via the processor, building the statistical sub-model when the confidence score does not exceed the minimum threshold level.

3. The method of claim 1, wherein selectively building a statistical sub-model further comprises:
via the processor, calculating a difference between a confidence score of the primary classification and a confidence score of the at least one secondary classification;
via the processor, comparing the difference with a difference threshold level; and
via the processor, building the statistical sub-model when the difference does not exceed the difference threshold level.

4. The method of claim 1, wherein selectively building a statistical sub-model further comprises:
via the processor, determining that the primary classification and the at least one secondary classification match a predetermined set of classifications; and
via the processor, building the statistical sub-model when a match is determined.

5. The method of claim 1, wherein the statistical model comprises a plurality of classes, wherein selectively building a statistical sub-model further comprises, via the processor, generating the statistical sub-model only for a subset of the plurality of classes of the statistical model.

6. The method of claim 1, further comprising:
via the processor, selecting features associated with the primary classification and the at least one secondary classification from a plurality of features from training data used to create the statistical model; and
via the processor, building the statistical sub-model using the selected features.

7. The method of claim 1, wherein selectively building a statistical sub-model further comprises:
via the processor, selecting training data associated with the primary classification and the at least one secondary classification from a corpus of training data used to create the statistical model; and
via the processor, building the statistical sub-model using the selected training data.

8. The method of claim 1, further comprising storing the statistical sub-model for subsequent recall in processing further text input.

9. The method of claim 1, further comprising, via the processor:
via the processor, determining a usage frequency of the statistical sub-model;
via the processor, comparing the usage frequency with a minimum frequency threshold level; and
via the processor, merging the primary classification and the at least one secondary classification into a single, merged class when the usage frequency exceeds the minimum frequency threshold level.

10. A method of improving classification accuracy of text input for use with a natural language understanding system, the method comprising:
via a processor, processing a plurality of text inputs using a statistical classification model (statistical model) and a statistical classification sub-model (statistical sub-model), wherein the statistical model comprises a plurality of classes and the statistical sub-model comprises a subset of the plurality of classes;
via the processor, determining a usage frequency of the statistical sub-model;
via the processor, comparing the usage frequency with a minimum frequency threshold level;
via the processor, merging the subset of the plurality of classes into a single, merged class within the statistical model when the usage frequency exceeds the minimum frequency threshold level; and
via the processor, outputting an updated statistical model specifying the merged class.

11. The method of claim 10, wherein outputting further comprises:
via the processor, selecting training data corresponding to the subset of the plurality of classes from training data used to generate the statistical model;
via the processor, updating the training data by associating the selected training data with the merged class; and
via the processor, generating the updated statistical model from the updated training data.

12. The method of claim 10, wherein outputting further comprises, via the processor, mapping each class of the subset of the plurality of classes to the merged class within the statistical model, wherein a text input belonging to any of the classes of the subset of the plurality of classes is classified to the merged class.

13. A computer program product comprising:
a computer-readable storage comprising computer-usable program code stored thereon that classifies text input for use with a natural language understanding system, the computer program product comprising:
computer-usable program code that determines classification information comprising a primary classification and at least one secondary classification for a received text input using a statistical classification model (statistical model);
computer-usable program code that selectively builds a statistical classification sub-model (statistical sub-model) according to whether the classification information conforms to an accuracy requirement;
computer-usable program code that selects the primary classification or the at least one secondary classification for the text input as a final classification according to the statistical sub-model; and
computer-usable program code that outputs the final classification for the text input, wherein
the computer-readable storage is not a transitory, propagating signal per se.

14. The computer program product of claim 13, wherein the computer-usable program code that selectively builds a statistical sub-model further comprises:
computer-usable program code that compares a confidence score of the primary classification with a minimum threshold level; and
computer-usable program code that builds the statistical sub-model when the confidence score does not exceed the minimum threshold level.

15. The computer program product of claim 13, wherein the computer-usable program code that selectively builds a statistical sub-model further comprises:
computer-usable program code that calculates a difference between a confidence score of the primary classification and a confidence score of the at least one secondary classification;
computer-usable program code that compares the difference with a difference threshold level; and
computer-usable program code that builds the statistical sub-model when the difference does not exceed the difference threshold level.

16. The computer program product of claim 13, wherein the computer-usable program code that selectively builds a statistical sub-model further comprises:
computer-usable program code that determines that the primary classification and the at least one secondary classification match a predetermined set of classifications; and
computer-usable program code that builds the statistical sub-model when a match is determined.

17. The computer program product of claim 13, wherein the statistical model comprises a plurality of classes, wherein the computer-usable program code that selectively builds a statistical sub-model further comprises computer-usable program code that generates the statistical sub-model only for a subset of the plurality of classes of the statistical model.

18. The computer program product of claim 13, wherein the computer-readable storage further comprises:
computer-usable program code that selects features associated with the primary classification and the at least one secondary classification from a plurality of features from training data used to create the statistical model; and
computer-usable program code that builds the statistical sub-model using the selected features.

19. The computer program product of claim 13, wherein the computer usable program code that selectively builds a statistical sub-model further comprises:
computer-usable program code that selects training data associated with the primary classification and the at least one secondary classification from a corpus of training data used to create the statistical model; and
computer-usable program code that builds the statistical sub-model using the selected training data.

20. The computer program product of claim 13, wherein the computer-readable storage further comprises computer-usable program code that stores the generated statistical sub-model for subsequent recall in processing further text input.

* * * * *